May 8, 1962  
JIRO MUKAI  
3,033,080  
GAUSS TYPE PHOTOGRAPHIC OBJECTIVE CONSISTING OF FIVE LENS  
ELEMENTS ARRANGED IN FOUR COMPONENTS  
Filed Oct. 27, 1958

SPHERICAL ABERRATION

IMAGE CURVATURE

IMAGE DISTORTION

INVENTOR.  
JIRO MUKAI  
BY  
ATTORNEY

United States Patent Office 3,033,080
Patented May 8, 1962

3,033,080
GAUSS TYPE PHOTOGRAPHIC OBJECTIVE CONSISTING OF FIVE LENS ELEMENTS ARRANGED IN FOUR COMPONENTS
Jiro Mukai, Yokohama City, Japan, assignor to Canon Camera Company, Inc., Tokyo, Japan, a corporation of Japan
Filed Oct. 27, 1958, Ser. No. 769,802
1 Claim. (Cl. 88—57)

This invention relates to Gauss type photographic objectives consisting of five lens elements arranged in four components.

A photographic objective having an aperture ratio of about 1:1.8 and having an image field of about 50 degrees usually consists of six or more lens elements. Such number of lens elements is considered necessary to correct the various aberrations of photographic objectives of high quality in the prior designs.

An object of this invention is to provide a photographic objective consisting of five lens members and having better correction than the prior and conventional objectives comprising six or more lens elements.

A clear concept of the scope and purpose of this invention may be obtained from the following description taken in connection with the attached drawing in which.

The features of the construction of the photographic objective according to the present invention are as follows:

The photographic objective consists of five lens elements arranged in four air spaced components of which the first component is a single positive meniscus lens with its convex surface directed to the object side. The second component is a negative meniscus component consisting of a front bi-convex and a rear bi-concave lenses cemented together and giving a negative action by the cemented surface. The third component is a single negative meniscus lens with its concave surface directed to the object side. The fourth component is a single bi-convex lens. Furthermore, the objective meets the following conditions, $$0.05 < N_3 - N_2 < 0.20$$
$$0.2f < |R_6| < 1.0f$$
$$0.12f < S_2 < 0.20f$$
$$45 < V_2 < 65$$
$$1.68 < (N_1, N_5) < 1.80$$

where $f$ designates the effective focal length of the objective, the radii of curvature of the respective lens elements being designated by $R_1, R_2, R_3 \ldots$, respectively, the refractive indices for the $d$-line of the spectrum by $N_1, N_2, N_3 \ldots$, the corresponding Abbe numbers by $V_1, V_2, V_3 \ldots$, the axial thicknesses of the lens elements by $d_1, d_2, d_3 \ldots$, and the air spaces between the respective adjacent components by $S_1, S_2, S_3 \ldots$, all subscripts increasing from the front to the rear of the objective.

Example

[Focal length $f=1$. Aperture ratio 1:1.8. Angular field $2\alpha=46°$]

| | | | |
|---|---|---|---|
| $R_1=0.600$ | $d_1=0.089$ | $N_1=1.7234$ | $V_1=38.0$ |
| $R_2=3.565$ | $S_1=0.004$ | | |
| $R_3=0.354$ | $d_2=0.139$ | $N_2=1.6228$ | $V_2=56.9$ |
| $R_4=-3.294$ | $d_3=0.043$ | $N_3=1.7400$ | $V_3=28.2$ |
| $R_5=0.241$ | $S_2=0.162$ | | |
| $R_6=-0.566$ | $d_4=0.171$ | $N_4=1.6080$ | $V_4=46.2$ |
| $R_7=-1.140$ | $S_3=0.004$ | | |
| $R_8=1.880$ | $d_5=0.071$ | $N_5=1.74400$ | $V_5=44.90$ |
| $R_9=-0.871$ | | | |

Figure 1:
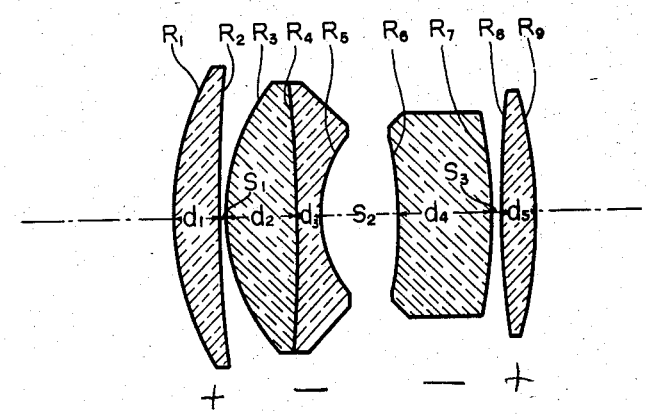
FIGURE 1 is a sectional view of a photographic objective according to this invention.
Figure 2:
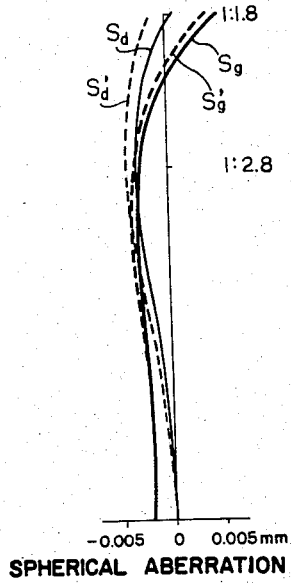
FIGURE 2 represents the spherical aberration of the objective.
Figure 3:
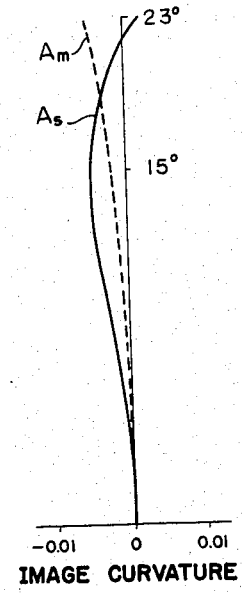
FIGURE 3 represents the image curvature of the objective.
Figure 4:
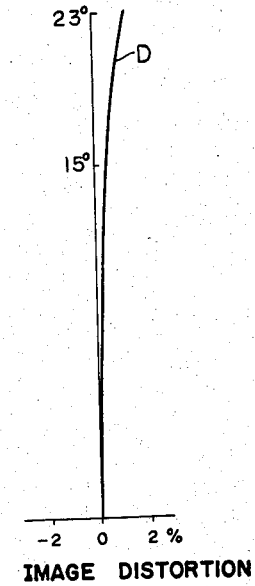
FIGURE 4 represents the distortion of the objective.

The aberrations of the above example are shown in FIGURES 2 to 4. In FIGURES 2, $S_d$ and $S_g$ represent the spherical aberrations for the $d$ and $g$ lines of the spectrum, respectively, and $S'_d$ and $S'_g$ represent the deviation from the sine condition for such lines. In FIGURE 3, $A_s$ and $A_m$ represent the image curvatures on the sagittal and meriodional planes, respectively. In FIGURE 4, D represents the distortion. These curves show the quality of the objective.

A photographic objective consisting of five lens elements arranged in four components wherein the third component is a single lens is not entirely a new thing in the Gauss type objective. However, in such conventional lens, the aberrations are not corrected to a sufficient extent, especially as to coma and as to chromatic aberrations, and, in addition, it is difficult to obtain a large image field for the objective.

The objective of my invention based upon the Gauss type objective consisting of six lens elements, and the effect obtained by the cemented surface in the third component of the prior Gauss type objective is transferred to another component in my improved objective so that the third component becomes a single lens and with the objective retaining the same or a higher efficiency. The positive refractive action given by the conventional cemented surface in the third component is replaced by making the refractive indices of the first and fourth components higher than 1.68. At the same time, the important effect of the cemented surface in the third component, the correction for coma, is also retained by the objecting meeting the following conditions:

$$0.05 < N_3 - N_2 < 0.20$$
$$0.2f < |R_6| < 1.0f$$
$$45 < V_2 < 65$$

In the prior known Gauss type objectives, chromatic aberration is corrected by the cemented surface in the third component, but in an objective according to my invention, chromatic aberration is eliminated by giving a value higher than 45 to the dispersive index of the optical material of the convex lens of the second component. Thus by this invention, in spite of the reduction of the number in lens elements as a whole, a photographic objective well corrected for aberrations and having an image field of about 50 degrees is obtained.

What I claim is:

A photographic objective having a relative aperture at least as large as $f/1.8$ and a field angle of at least 46° which is highly corrected for coma and chromatic aberration according to the following numerical data:

[Focal length $f=1$. Aperture ratio $f/1.8$. Angular field $2\alpha=46°$]

| Component | Radius of Curvature | Axial Thickness Air Spacing | Index of Refraction | Abbe Number |
|---|---|---|---|---|
| I | $R_1 = 0.600$ | | | |
| | | $d_1=0.089$ | $N_1=1.7234$ | $V_1=38.0$ |
| | $R_2 = 3.565$ | | | |
| | | $S_2=0.004$ | | |
| | $R_3 = 0.354$ | | | |
| II | | $d_2=0.139$ | $N_2=1.6228$ | $V_2=56.8$ |
| | $R_4=-3.294$ | | | |
| | | $d_3=0.043$ | $N_3=1.7400$ | $V_3=28.2$ |
| | $R_5 = 0.241$ | | | |
| | | $S_2=0.162$ | | |
| | $R_6=-0.566$ | | | |
| III | | $d_4=0.171$ | $N_4=1.6080$ | $V_4=46.2$ |
| | $R_7=-1.140$ | | | |
| | | $S_3=0.004$ | | |
| | $R_8= 1.880$ | | | |
| IV | | $d_5=0.071$ | $N_5=1.7440$ | $V_5=44.90$ |
| | $R_9=-0.871$ | | | | where $R_{subscript}$ is the radius of curvature of the successive lens surfaces, $d_{subscript}$ the axial thickness of the successive lens elements, $S_{subscript}$ the spacing between successive lens elements, $N_{subscript}$ the refractive index of the glass of the successive lens elements, and $V_{subscript}$ the Abbe number of the glass of the successive lens elements, the subscripts increasing in the direction from the object side of the objective.

References Cited in the file of this patent

UNITED STATES PATENTS

| | | |
|---|---|---|
| 2,487,749 | Wynne | Nov. 8, 1949 |
| 2,499,264 | Wynne | Feb. 28, 1950 |
| 2,672,778 | Brendel | Mar. 23, 1954 |
| 2,683,398 | Klemt et al. | July 13, 1954 |
| 2,777,362 | Berger et al. | Jan. 15, 1957 |
| 2,818,776 | Hayes et al. | Jan. 7, 1958 |
| 2,831,395 | Klemt | Apr. 22, 1958 |

FOREIGN PATENTS

| | | |
|---|---|---|
| 963,687 | France | Jan. 12, 1950 |